(12) United States Patent
Kamiya et al.

(10) Patent No.: US 7,769,519 B2
(45) Date of Patent: Aug. 3, 2010

(54) MOTION CONTROL DEVICE FOR VEHICLE

(75) Inventors: Masahiko Kamiya, Anjo (JP);
Tadayoshi Usami, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 91 days.

(21) Appl. No.: 11/987,210

(22) Filed: Nov. 28, 2007

(65) Prior Publication Data
US 2008/0147272 A1 Jun. 19, 2008

(30) Foreign Application Priority Data
Dec. 18, 2006 (JP) ............... 2006-339980
Nov. 9, 2007 (JP) ............... 2007-291864

(51) Int. Cl.
*B60B 39/00* (2006.01)
*B60T 7/12* (2006.01)
*G05D 1/00* (2006.01)
*G06F 7/00* (2006.01)
*G06F 17/00* (2006.01)

(52) U.S. Cl. ............... 701/71; 303/139; 303/140; 303/146

(58) Field of Classification Search ............... None
See application file for complete search history.

(56) References Cited

U.S. PATENT DOCUMENTS

| | | | | |
|---|---|---|---|---|
| 5,464,187 A * | 11/1995 | Linkner, Jr. | ............... | 248/635 |
| 5,697,678 A * | 12/1997 | Huber | ............... | 303/116.4 |
| 6,364,646 B1 * | 4/2002 | Kirtley et al. | ............... | 418/152 |
| 6,386,650 B2 * | 5/2002 | Kouzuki | ............... | 303/121 |
| 6,435,851 B2 * | 8/2002 | Mallen | ............... | 418/178 |
| 6,592,191 B2 * | 7/2003 | Murayama et al. | ............... | 303/116.4 |
| 6,851,762 B2 * | 2/2005 | Kamiya et al. | ............... | 303/113.3 |
| 7,094,044 B2 * | 8/2006 | Strueh | ............... | 418/82 |
| 7,399,171 B2 * | 7/2008 | Yamaguchi et al. | ............... | 418/171 |
| 7,407,234 B1 * | 8/2008 | McCormick | ............... | 303/119.3 |
| 7,424,347 B2 * | 9/2008 | Babala et al. | ............... | 701/1 |
| 2004/0102888 A1 * | 5/2004 | Burgdorf et al. | ............... | 701/70 |
| 2004/0163470 A1 * | 8/2004 | Babala et al. | ............... | 73/514.01 |
| 2006/0055232 A1 * | 3/2006 | Koyama | ............... | 303/10 |
| 2006/0093507 A1 * | 5/2006 | Yamaguchi et al. | ............... | 418/61.3 |

(Continued)

FOREIGN PATENT DOCUMENTS

WO    WO 2005/039946 A1    5/2005

*Primary Examiner*—Jack Keith
*Assistant Examiner*—Rami Khatib
(74) *Attorney, Agent, or Firm*—Buchanan Ingersoll & Rooney PC (57) ABSTRACT

A motion control device for a vehicle is configured so that a hydraulic unit mounting therein a pump for generating a controlled hydraulic pressure applied to respective wheel cylinders of the vehicle is integrated with a control unit provided with a yaw rate sensor for detecting a yaw rate of the vehicle and capable of controlling the hydraulic unit. The pump is composed of a pump drive section, drivingly rotated by a motor, and pumping sections which perform a pump function with the rotation of the pump drive section. The yaw rate sensor, the motor and the pump are arranged to satisfy a positional relation that the extending direction of a detection axis of the yaw rate sensor does not coincide with both of the extending directions of a rotational axis of the motor and a rotational axis of the pump drive section.

3 Claims, 8 Drawing Sheets

U.S. PATENT DOCUMENTS

| | | | |
|---|---|---|---|
| 2006/0125314 A1* | 6/2006 | Hashiba | 303/113.1 |
| 2006/0228233 A1* | 10/2006 | Cook | 417/360 |
| 2007/0129861 A1* | 6/2007 | Hashiba et al. | 701/29 |
| 2007/0192003 A1* | 8/2007 | Hashiba | 701/37 |
| 2007/0231177 A1* | 10/2007 | Yamaguchi et al. | 418/166 |
| 2008/0036295 A1* | 2/2008 | Sakai | 303/116.4 |
| 2008/0048493 A1* | 2/2008 | Grundl et al. | 303/145 |
| 2008/0272646 A1* | 11/2008 | Nakazawa et al. | 303/155 |

* cited by examiner

MOTION CONTROL DEVICE FOR VEHICLE

INCORPORATION BY REFERENCE

This application is based on and claims priority under 35 U.S.C. 119 with respect to Japanese Applications No. 2006-339980 filed on Dec. 18, 2006 and No. 2007-291864 filed on Nov. 9, 2007, the entire contents of which are incorporated herein by reference.

BACKGROUND OF THE INVENTION

1. Field of the Invention

The present invention relates to a motion control device for a vehicle which integrally incorporates a hydraulic unit mounting therein a pump for generating a controlled hydraulic pressure applied to respective wheel cylinders of the vehicle and a control unit provided with a yaw rate sensor for detecting the yaw rate of the vehicle and capable of controlling the hydraulic unit.

2. Discussion of the Related Art

Heretofore, there has been known a motion control device for a vehicle which is shown in International Publication WO 2005/039946 A1 (hereafter referred to as Patent Document 1). As shown in FIGS. 1 and 2 of Patent Document 1, the motion control device includes a hydraulic unit (2, 3), a control unit (4) and a vehicle behavior sensor (5). The hydraulic unit 3 is supported by a support bracket (10) through three support members (11). The motion control device has three support points (7, 8, 9) for supporting the hydraulic unit 3 on the support bracket (10). These support points define one plane (E), and this plane is arranged to extend in the neighborhood of the gravity center (S) of the motion control device.

Further, there has been known another motion control device for a vehicle which is shown in U.S. Patent Application Publication No. US 2004/0102888 A1 (hereafter referred to as Patent Document 2) equivalent of International Application Publication in Japan No. 2004-506572. As shown in FIG. 4 of Patent Document 2, a valve block 19 is elastically suspended from a holder 25 through a screw 24 and a damper element 22, and a controller unit 1 is secured to the holder 25 through another screw 24' in a manner that vibration is not damped, wherein an intermediate chamber or space 15 is provided to separate the controller unit 1 from the valve block 19. A valve dome 12 which protrudes from the valve block 19 toward the controller unit 1 is surrounded by a valve coil 16 (magnetic plug) arranged in the controller unit 1. The valve coil 16 is connected by means of a connector member 13 which is elastic, conductive and removable, to a printed circuit board 8 in the controller unit 1.

Further, there has been known still another motion control device for a vehicle which is shown in U.S. Patent Application Publication No. US 2004/0163470 A1 (hereafter referred to as Patent Document 3) equivalent of International Application Publication in Japan No. 2004-535325. As shown in FIG. 9 of Patent Document 3, a bracket 16 constitutes a main body 161 taking a generally U-letter shape, on which an electronically operated hydraulic valve unit 162 is mounted. The hydraulic valve unit 162 includes an ECU (Electronic Control Unit) 163 which carries at least one accelerometer and at least one angular velocity sensor. The hydraulic valve unit 162 is secured to the bracket 160 by means of plural threaded fasteners 164 (one only shown in the figure). Further, where an ECU 20 is mounted directly on the vehicle, the mounting position is selectable so that motion sensors 24, 25 and 26 shown in FIG. 3 of Patent Document 3 can be brought into alignment with respective reference axes of the vehicle corresponding thereto.

In the motion control device described in Patent Document 1, the directions in which the three support members (11) support the hydraulic unit (3) are in parallel relations with one another. In other words, the support directions extend in one direction only. Thus, so far as the one direction is concerned, the vibration inputted from a vehicle body can be appropriately attenuated or damped, whereby the transmission of the vibration which is generated by the actuation of hydraulic devices in the motion control device can be suppressed properly. However, it is unable to sufficiently reduce the influence that the vibration generated by the actuation of a pump (of a reciprocation type) being a hydraulic device exerts on a yaw rate sensor.

Further, also in the motion control device described in Patent Document 2, the directions in which at least three support points support the motion control device are in parallel relations with one another. In other words, the support directions extend in one direction only. Thus, so far as the one direction is concerned, the vibration inputted from a vehicle body can be appropriately attenuated or damped, whereby the transmission of the vibration which is generated by the actuation of hydraulic devices in the motion control device can be suppressed properly. However, it is unable to sufficiently reduce the influence that the vibration generated by the actuation of a pump (of a reciprocation type) being a hydraulic device exerts on a yaw rate sensor.

Further, with respect to the motion control device described in Patent Document 3, there is included a teaching "The motion sensors 24, 25 and 26 are in alignment with vehicle reference axes corresponding thereto", but there is not included any specific teaching about the technique which takes the mutual relation between the pump (of the reciprocation type) being a hydraulic device and the yaw rate into consideration to reduce the influence that the vibration generated by the actuation of the pump exerts on the yaw rate sensor.

SUMMARY OF THE INVENTION

Accordingly, it is a primary object of the present invention to provide an improved motion control device for a vehicle which is capable of reducing the influence that the vibration generated by the actuation of a pump being a hydraulic device exerts on a yaw rate sensor so that the accuracy of the motion control device in detecting the behavior of the vehicle can be enhanced.

Briefly, according to the present invention, there is provided a motion control device for a vehicle, which comprises a hydraulic unit mounting therein a pump for generating a controlled hydraulic pressure applied to respective wheel cylinders of the vehicle, and a control unit provided with a yaw rate sensor for detecting a yaw rate of the vehicle and capable of controlling the hydraulic unit, wherein the hydraulic unit and the control unit are integrated. The pump is composed of a pump drive section drivingly rotated by a motor and a pumping section for performing a pump function with rotation of the pump drive section. The yaw rate sensor, the motor and the pump are arranged to satisfy a positional relation that the extending direction of a detection axis of the yaw rate sensor differs from both of the extending directions of a rotational axis of the motor and a rotational axis of the pump drive section.

With this construction, the yaw rate sensor, the motor and the pump are arranged to satisfy the positional relation that the extending direction of the detection axis of the yaw rate sensor differs from both of the extending directions of the rotational axis of the pump and the rotational axis of the pump drive section. Thus, even when the driving of the pump drive section by the operation of the pump causes a rotational moment around the rotational axes to be applied to the motor and the pump, the yaw rate sensor can be suppressed from detecting the rotational behavior or movement of the motion control device caused by the rotational moment. Therefore, it can be realized to enhance the accuracy of the motion control device in detecting the behavior of the vehicle.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
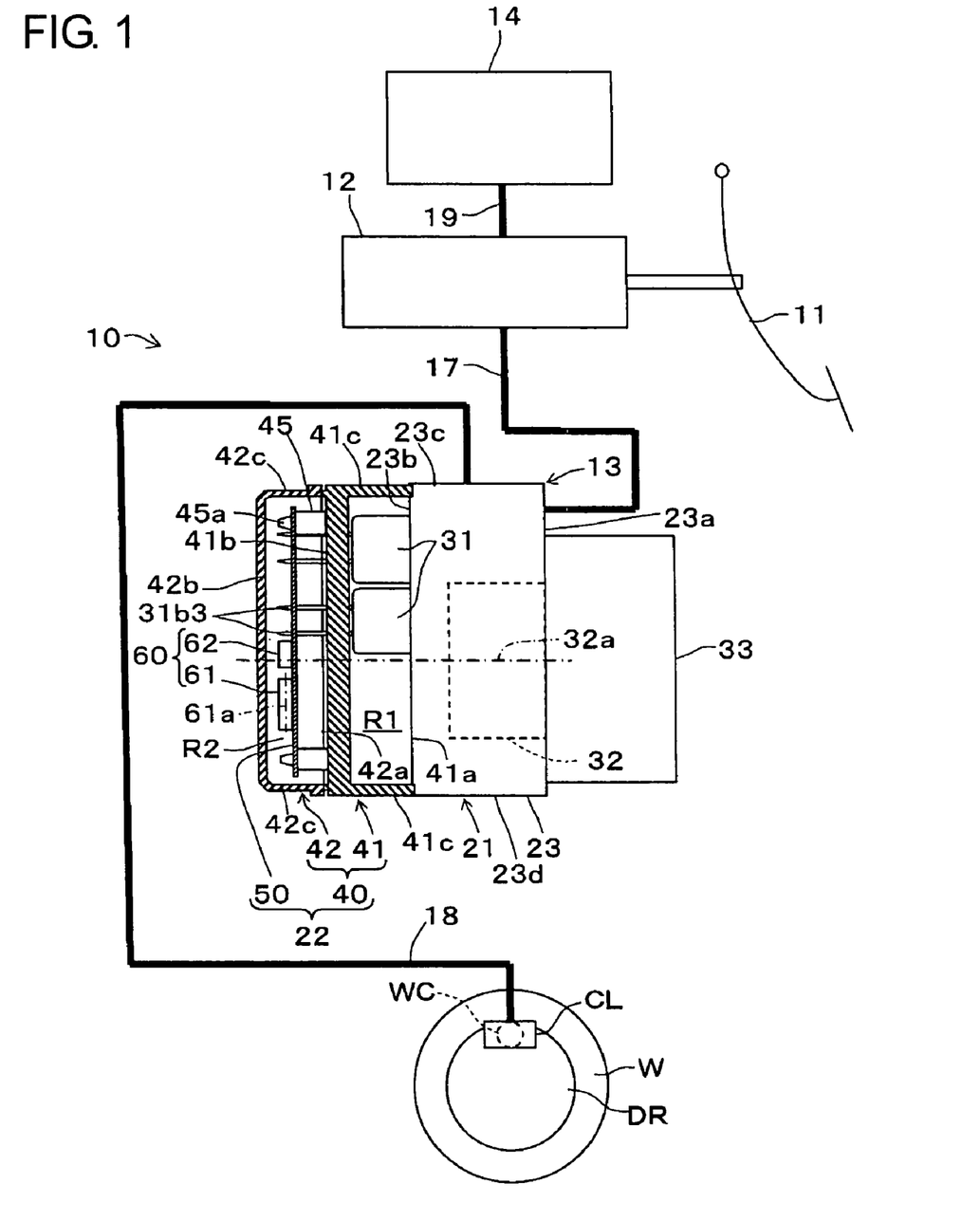
FIG. 1 is a schematic view showing a first embodiment of a motion control device with a rotary pump for a vehicle according to the present invention.
Figure 2:
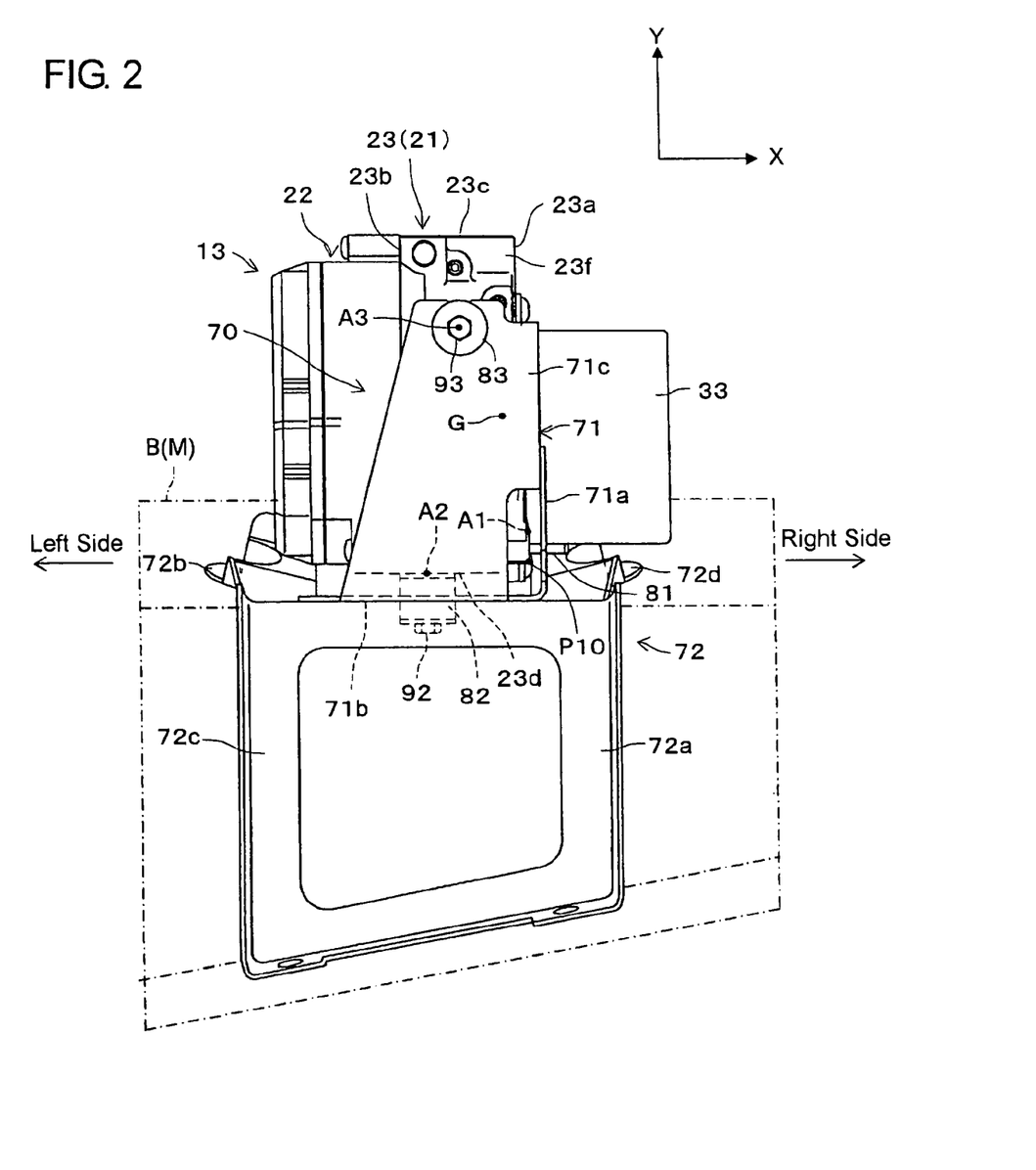
FIG. 2 is a front view of the motion control device which is mounted on a vehicle body through a bracket.
Figure 3:
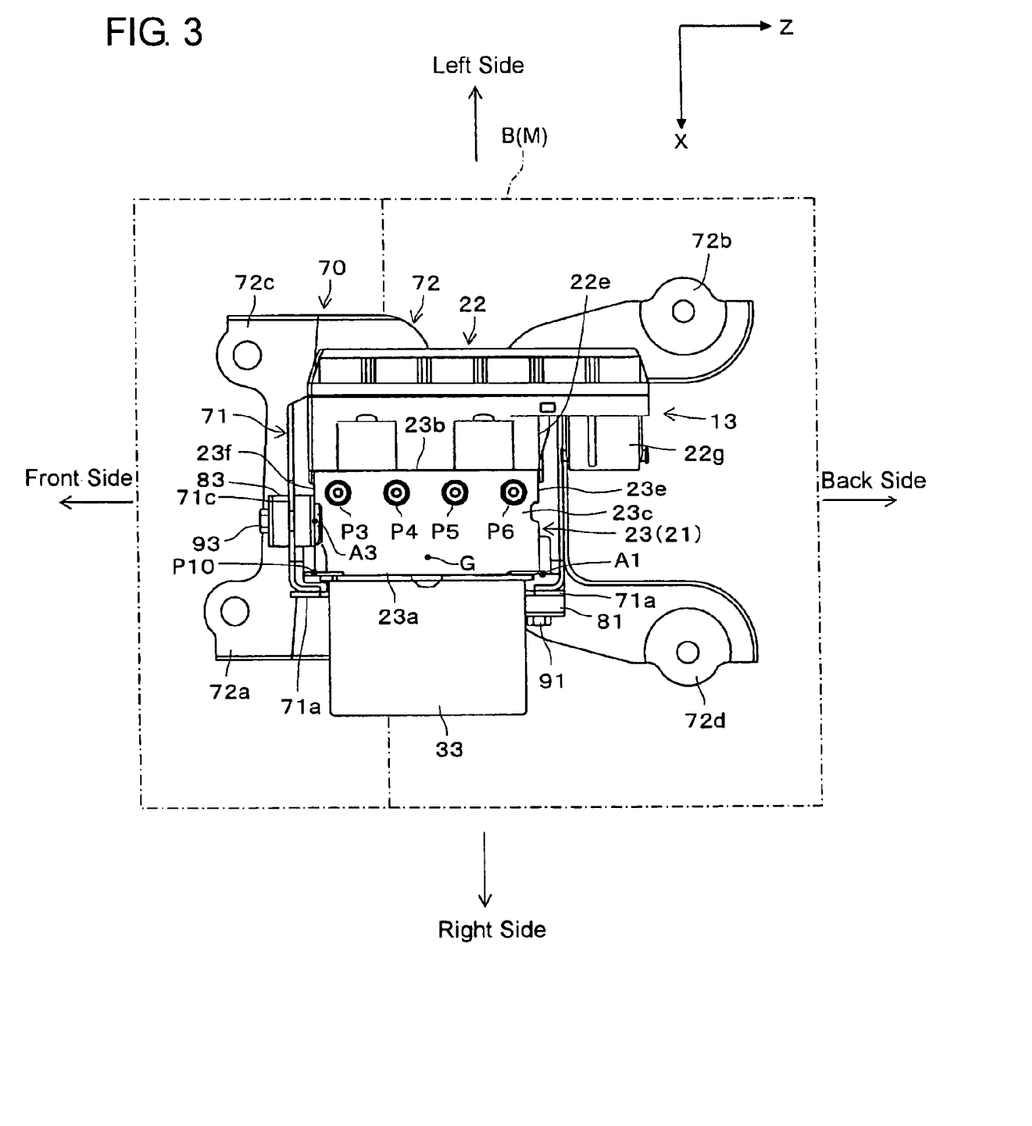
FIG. 3 is a top view of the motion control device which is mounted on the vehicle body through the bracket.
Figure 4:
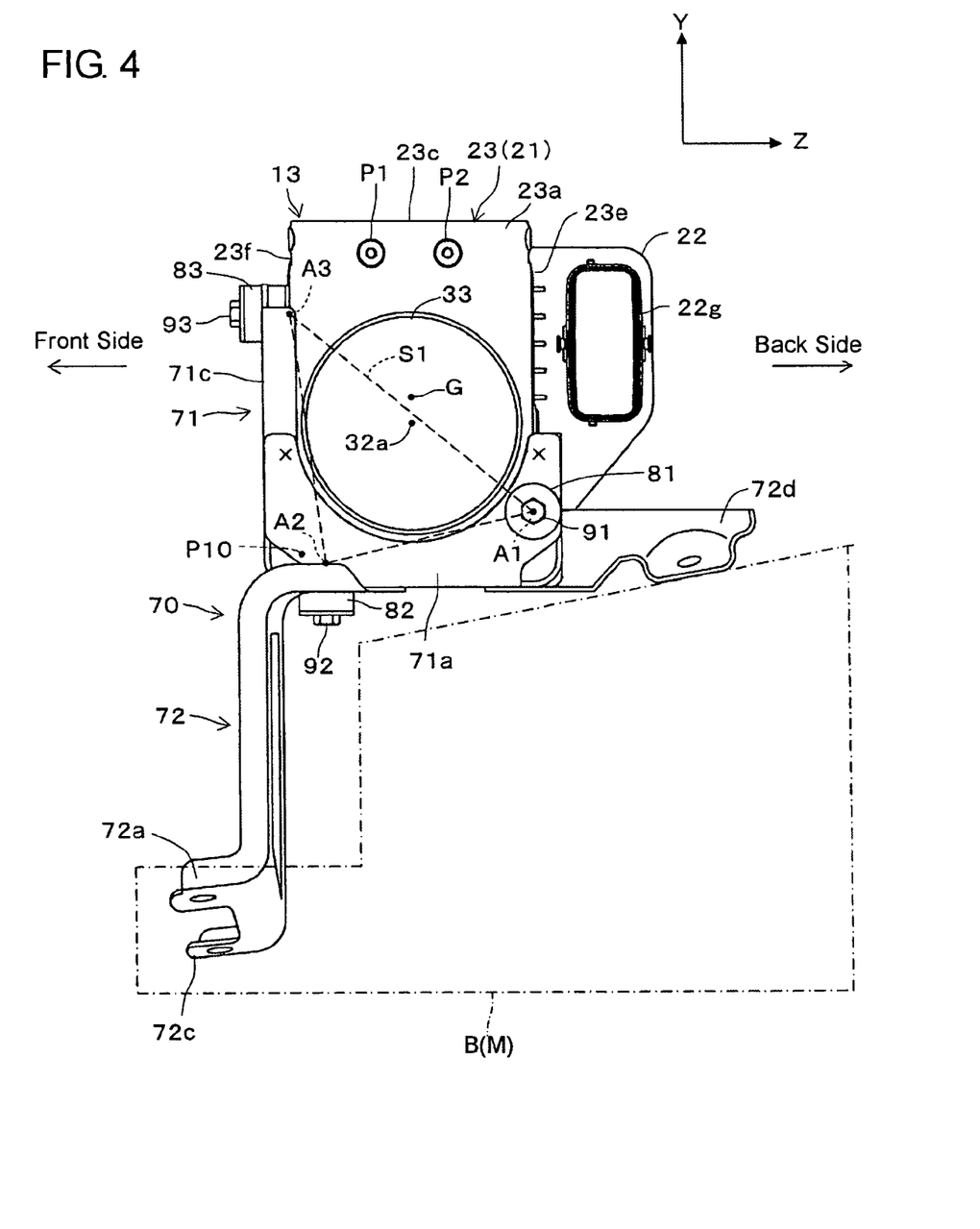
FIG. 4 is a side view of the motion control device which is mounted on the vehicle body through the bracket.

Hereinafter, a first embodiment of a motion control device for a vehicle according to the present invention will be described with reference to the accompanying drawings. FIG. 1 is a schematic view showing a hydraulic brake system 10 incorporating the motion control device 13. FIGS. 2 to 4 are a front view, a top view and a side view each showing the motion control device 13 which is supported on a vehicle body B of a vehicle M through a bracket 70.

The hydraulic brake system 10 applies brake forces to wheels W (one only shown for brevity) of the vehicle M. As shown in FIG. 1, the hydraulic brake system 10 is provided with a master cylinder 12, wheel cylinders WC (one only shown for brevity), the motion control device 13 and a reservoir tank 14.

The master cylinder 12 generates a hydraulic pressure (base hydraulic pressure) depending on a brake manipulation state which is brought about by the stepping of a brake pedal 11, and applies the hydraulic pressure to the wheel cylinders WC which restrict rotations of the wheels W of the vehicle M. It is to be noted that the vehicle M has four wheels W and four wheel cylinders WC associated therewith. In FIG. 1, only one of the four wheels W is shown for brevity.

Each wheel cylinder WC is provided in a caliper CL and receives a pair of pistons (not shown) which are fluid-tightly slidable therein. When each wheel cylinder WC is supplied with the base hydraulic pressure or a controlled hydraulic pressure, the pistons push a pair of brake pads (not shown) being friction members and close in on a disc rotor DR being a rotational member from both sides to restrict rotation of the disc rotor DR. The brake pads and the disc rotor DR constitute a friction brake.

Although a disc type brake is employed in this particular embodiment, there may be employed a drum type brake. In this modified form, when each wheel cylinder WC is supplied with the base hydraulic pressure or the controlled hydraulic pressure, each piston pushes or expands a pair of brake shoes (not shown) and brings the same into contact with an internal surface of a brake drum (not shown) rotating bodily with each wheel W to restrict rotation of the wheel W.

The motion control device 13 is a single structure (integral configuration) composed of a hydraulic unit 21 and a control unit 22 which are integrated with each other. The hydraulic unit 21 mounts a plurality of hydraulic devices for individually controlling the hydraulic pressures applied to the respective wheel cylinders WC of the vehicle M. The control unit 22 is provided with vehicle behavior sensors 60 for detecting the behavior of the vehicle M, and the vehicle behavior sensors 60 are capable of controlling the hydraulic unit 21.

The hydraulic unit 21 is of the type well-known in the art and is constituted by packaging in a single case differential pressure control valves, pressure increasing valves, pressure reducing valves, a reservoir, a pump, an electric motor for driving the pump, and the like. The pressure increasing valves and the pressure reducing valves serves as ABS control valves. The hydraulic unit 21 is capable of applying the base hydraulic pressure form the master cylinder 12 directly to the wheel cylinders WC. The hydraulic unit 21 is also capable of applying controlled hydraulic pressures, which are generated by actuating the pump and by controlling the differential pressure control valves, to the wheel cylinders WC of the respective wheels W. That is, the hydraulic unit 21 is not only capable of generating in the wheel cylinders WC the hydraulic pressure (the base hydraulic pressure) depending on the manipulation state (i.e., the stepping state) of the brake pedal 11 by the driver, but also capable of controlling hydraulic pressures (controlled hydraulic pressures) to the wheel cylinders WC regardless of the manipulation state (i.e., the stepping state) of the brake pedal 11 by the driver.

The hydraulic unit 21 is provided with a main body 23 made of a metal material and taking a generally hexahedral shape. As shown schematically in FIG. 1, the main body 23 communicates with the master cylinder 12 through a piping 17 and also communicates with the wheel cylinders WC through another piping 18. More specifically, the right side surface (as viewed in FIG. 1) of the main body 23, that is, a motor mounting surface 23a to which the electric motor 33 is attached is provided with two ports P1, P2 (shown in FIG. 4), which communicate respectively with two ports (one only shown in FIG. 1) of the master cylinder 12. Ports P3-P6 (shown in FIG. 3) are formed on the top surface or a port forming surface 23c of the main body 23 and communicate respectively with the wheel cylinders WC (one only shown in FIG. 1). Thus, the piping 17 is composed of two fluid pipes or conduits, while the piping 18 is composed of four fluid pipes or conduits.

Oil passages communicating with the respective ports P1-P6 are formed in the main body 23. The oil passages have arranged thereon the differential pressure control valves, electromagnetic valves 31 as the pressure increasing control valves and the pressure reducing control valves which serve as the ABS control valves, the reservoir (not shown), the pump 32 and the like. The differential pressure control valves, the electromagnetic valves 31 as the pressure increasing control valves and the pressure reducing control valves which serve as the ABS control valves, and the pump 32 are hydraulic devices for individually controlling hydraulic pressures applied to the respective wheel cylinders WC.

As shown in FIG. 1, the electromagnetic valves 31 are assembled onto a control unit mounting surface 23b which is a surface (left side surface) of the main body 23 opposite to the motor mounting surface 23a and to which the control unit 22 is attached. The electromagnetic valves 31 are attached to the main body 23 with their solenoid sections protruding in a first chamber R1. Terminals 31b3 of each electromagnetic valve 31 pass through a bulkhead 41b and are soldered at their extreme ends to the control board 50. Terminals 31b3 of each electromagnetic valve 31 may be connected to the control board 50 indirectly through busbars or the like. The electromagnetic valves 31 may be linear valves (e.g., differential pressure control valves) or may be ON-OFF shutoff valves (e.g., ABS control valves).

The pump 32 is a rotary pump and is arranged in the main body 23. The pump 32 is driven by the electric motor 33. Whenever required, the pump 32 is driven by the operation of the electric motor 33 assembled on the motor mounting surface 23a of the main body 23 and draws brake fluid from the reservoir (not shown) provided in the main body 23 or from the master cylinder 12 through suction shutoff valves (not shown).

As the rotary pump, there is used a gear pump or a vane pump. A gear pump (trochoid pump) is generally well known and discharges fluid from a gear meshing area upon rotations of two gears (i.e., an external gear and an internal gear) contained in a housing. In the trochoid pump, the internal gear and the external gear are eccentric. The external gear arranged inside the internal gear is driven by an electric motor.

Figure 7:
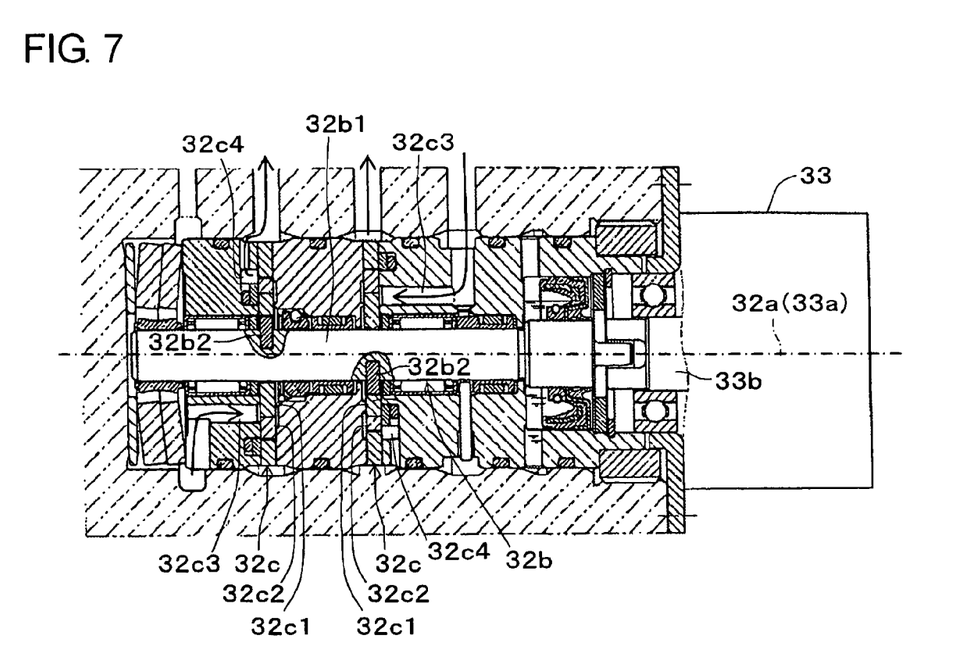
FIG. 7 is a sectional view showing the construction of the rotary pump incorporated in the motion control device shown in FIG. 1.

Specifically, as shown in FIG. 7, the pump 32 is composed of a pump drive section 32b driven by the electric motor 33 and a plurality (two in this particular embodiment) of pumping sections 32c each for performing a pump function with rotation of the pump drive section 32b.

The pump drive section 32b is composed of a shaft 32b1 coupled to an output shaft 33b of the motor 33 and torque pins 32b2 which rotationally joint the shaft 32b1 with external gears 32c1. Each pumping section 32c is composed of the external gear 32c1 coaxial and rotatable bodily with the shaft 32b1 and an internal gear 32c2 meshing at its internal gear portion with the external gear 32c1. Each internal gear 32c2 is held eccentric and rotatable relative to the external gear 32c1. The both gears 32c1, 32c2 mesh with each other at an arcuate area (meshing area), and a space is provided at a portion which is radially opposite to the arcuate meshing area and at which they do not mesh with each other. A suction port 32c3 is arranged on one side of the arcuate meshing area (i.e., on the side ahead of the arcuate meshing area), while a discharge port 32c4 is arranged on the other side of the arcuate meshing area (i.e., on the side behind the arcuate meshing area). As each external gear 32c1 is rotated by the operation of the motor 33, each internal gear 32c2 is also rotated to change the meshing relation between the external gear 32c1 and the internal gear 32c2. As a result, brake fluid is drawn from the suction port 32c3 and is discharged from the discharge port 32c4. That is, with rotation of the pump drive section 32b, each pumping section 32c is rotationally driven to perform a pump function.

The respective pumping sections 32c are arranged in series along the rotational axis 32a of the pump drive section 32b, and the two adjacent pumping sections 32c have respective suction ports 32c3, 32c3 arranged on radially opposite sides with respect to the rotational axis of the pumping sections 32c (which coincides with the rotational axes 32a, 33a in this particular embodiment) and respective discharge ports 32c4, 32c4 arranged on radially opposite sides with respect to the rotational axis of the pumping sections 32c. In other words, the suction port 32c3 of one of the two adjacent pumping sections 32c is radially opposite to the suction port 32c3 of the other pumping section 32c with the rotational axis 32a of the shaft 32b1 therebetween, and likewise, the discharge port 32c4 of the one pumping section 32c is radially opposite to the discharge port 32c4 of the other pumping section 32c with the rotational axis 32a of the shaft 32b1 therebetween. In the rotary pump 32 with the two internal gears 32c2 eccentric with the rotational axis 32a, the adjacent internal gears 32c2, 32c2 can be arranged in an alternate fashion by arranging the suction port 32c3 and the discharge port 32c4 of one pumping section 32c on radially opposite sides of those of the other pumping section 32c with respect to the rotational axis of the pumping sections 32c (which coincides with the rotational axes 32a, 33a in this particular embodiment).

Further, in the rotary pump 32, the rotational axis 33a of the motor 33 is a center axis of the output shaft 33b and in axial alignment with the rotational axis 32a of the shaft 32b1 or the pump drive section 32b.

A vane pump is also generally well known, in which a rotor with a plurality of vanes radially arranged therein is rotatably contained in a housing. With rotation of the rotor, respective volumes each partitioned with two adjoining vanes discharge fluid by repeating expansions and contractions due to the eccentricity of the rotor from the housing.

A pulsation frequency of the pump 32 is set to be higher than a detection frequency band (referred to later) of the yaw rate sensor 61. The pulsation frequency of the pump 32 depends on the number of pump gear teeth and the pump rotational speed. Therefore, it is possible to set the number of the gear teeth and the rotational speed so that the pulsation frequency of the pump 32 becomes higher than the detection frequency band of the yaw rate sensor 61.

In addition to the aforementioned motor mounting surface 23a, control unit mounting surface 23b and port forming surface 23c, the main body 23 also has a surface (lower surface shown in FIG. 2) 23d opposite to the port forming surface 23c, a connector surface (back surface shown in FIG. 4) 23e aligned with a connector forming surface 22e of the control unit 22 provided with a connector 22g, and a surface (front surface shown in FIG. 4) 23f opposite to the connector surface 23e.

As shown in FIG. 1, the control unit 22 is composed of a casing 40 and the control board 50. The casing 40 is composed of a case 41 and a cover 42.

The case 41 takes the shape of a tray having an opening 41a. The case 41 is made of a synthetic resin and bodily has a base portion 41b, forming the aforementioned bulkhead, and a side or lateral portion 41c upstanding from the circumferential edge of the base portion 41b. The opening end (extreme end of the lateral portion 41c) of the opening 41a is held in contact airtightly with the control unit mounting surface 23b of the main body 23 of the hydraulic unit 21. The first chamber R1 for accommodating or containing the electromagnetic valves 31 is formed between the main body 23 and the case 41.

The cover 42 takes the shape of a tray having an opening 42a. The cover 42 is made of a synthetic resin and bodily has a base portion 42b and a side or lateral portion 42c upstanding from the circumferential edge of the base portion 42b. The opening end (extreme end of the lateral portion 42c) of the opening 42a is adhered by vibration welding or the like to the circumferential portion of the bulkhead or base portion 41b of the case 41. A second chamber R2 for accommodating or containing the control board 50 is formed between the case 41 and the cover 42.

As described above, the casing 40 has the opening 41a and is attached to the main body 23 with the opening end being air-tightly contacted with the control unit mounting surface 23b of the main body 23 to cover the electromagnetic valves 31.

Further, the base portion 41b of the case 41 forms the bulkhead which partitions the interior of the casing 40 into the first chamber R1 and the second chamber R2. The bulkhead 41b is arranged to face the control board 50.

Support pillars 45 which support the control board 50 are formed on the bulkhead 41b bodily with the case 41. The support pillars 45 support and hold the control board 50 by engaging snap fitting portions 45a formed at their extreme ends with engaging holes which are formed to pass through the control board 50 at, e.g., four corners of the same.

The control board 50 controls the electric motor 33 (hence, the pump 32) and the respective electromagnetic valves 31 in response to signals inputted from wheel speed sensors (not shown) for detecting rotational speeds (wheel speeds) of the wheels W and the vehicle behavior sensors 60 and performs an ordinary brake control, an anti-lock brake control (ABS), a side skid prevention control (ESC) and the like.

In the ordinary brake control, the base hydraulic pressure which is generated from the master cylinder 12 upon the manipulation or stepping of the brake pedal 11 is supplied as it is to the respective wheel cylinders WC to apply a brake force to each wheel W. At this time, the differential pressure control valves and the pressure increasing control valves remain deenergized to be in an open state, the pressure reducing control valves also remain deenergized to be in a closed state, and the pump 32 is out of operation.

The anti-lock brake control is a control that prevents any wheel from being locked during a braking operation to secure an optimum brake force, the vehicle stability and the steerability even on a slippery road surface or the like. In this control, when being in a braking operation by the manipulation of the brake pedal 11 is detected, a control is executed to apply an optimum brake force to each wheel so that the difference between each wheel speed and the vehicle body speed should not reach a predetermined value or over.

Specifically, in order that each pair of the pressure increasing control valve and the pressure reducing control valve which pair are assigned to each wheel W are brought into a pressure increasing mode, a pressure retention mode and a pressure reducing mode in turn, the pressure increasing control valve and the pressure reducing control valve are energized or deenergized in dependence on each mode. The pressure increasing control valve and the pressure reducing control valve of each pair are kept both deenergized to be in the open state and the closed state respectively in the pressure increasing mode, are energized and deenergized respectively to be held both in the closed state in the pressure retention mode, and are both energized to be in the closed state and the open state in the pressure reducing mode. The remaining wheels are controlled in the same manner. In addition, during the ABS control, a control operation is executed so that the electric motor 33 is electrified to drive the pump 32.

The side skid prevention control is a control that secures the stability of the vehicle by automatically controlling the braking operation and/or the operation of a combustion engine (not shown) when it is detected that the vehicle making a turn tends to skid laterally. In this control, when the yaw rate sensor 61 detects that the vehicle is turning, the application of a brake force to any selected wheel and the control of the engine power are performed to keep within a predetermined range the difference between an actual yaw rate detected by the yaw rate sensor 61 and a target yaw rate which is calculated based on a vehicle body speed, a vehicle steering angle and a stability factor.

For example, when the rear wheels tend to skid laterally during a left turn, a control to apply a brake force to the front right wheel only is executed to suppress the tendency. At this time, the electric motor 33 is electrified to operate the pump 32. The differential pressure control valve arranged between the master cylinder 12 and the wheel cylinder for the front right wheel is energized to be placed in a differential pressure generating state, and the pressure increasing control valve and the pressure reducing control valve which are associated with each of other wheels than the front right wheel are respectively energized and deenergized to be brought all into the closed state not to apply a hydraulic pressure to any other wheel than the front right wheel, whereas the pressure increasing control valve and the pressure reducing control valve which are associated with the front right wheel are both deenergized to be placed respectively in the open state and the closed state.

The vehicle behavior sensors 60 detect the behavior of the vehicle M. The vehicle behavior sensors 60 are mounted on the control board 50. In this particular embodiment, the vehicle behavior sensors 60 include the yaw rate sensor 61 for detecting the yaw rate of the vehicle M and an acceleration sensor 62 for detecting the acceleration in a front-rear direction and a left-right direction of the vehicle M. In this particular embodiment, the yaw rate sensor 61 and the acceleration sensor 62 are discrete elements. There may be used a vehicle behavior sensor 60 which integrally incorporate the yaw rate sensor 61 and the acceleration sensor 62 therein.

The yaw rate sensor 61 is for example a vibration type yaw rate sensor which incorporates therein a vibration member (also serving as a detection portion) like a tuning fork. When the vibration member to which excitation vibration is applied in an exciting direction normal to the rotational axis of the vibration member is given an yaw rate around the rotational axis, a Coriolis force proportional to the yaw rate is generated in a detection direction which is perpendicular to the rotational axis as well as to the exciting direction, that is, detection vibration is generated. The yaw rate sensor 61 outputs the displacement signal of the detection vibration to the control board 50. Alternatively, there may be used a yaw rate sensor of the type that is provided with a vibration member constituted by a square-shape weight (mass) having a comb teeth electrode to vibrate.

The yaw rate sensor 61 is arranged in the vehicle M to make the rotational axis of the vibration member placed in alignment or parallel with a yawing direction rotational axis of the vehicle M, that is, an axis which is positioned around at the gravity center of the vehicle M to extend in a direction normal to a horizontal surface.

The rotational axis of the vibration member is a detection axis 61a of the yaw rate sensor 61. The yaw rate sensor 61 and the pump 32 are arranged to satisfy a positional relation that the extending direction of the detection axis 61a of the yaw rate sensor 61 does not coincide with (i.e., differs from) the extending direction of the rotational axis 32a of the pump 32 and the rotational axis 33a of the motor 33, as shown in FIG. 1. For example, it is preferable that there is satisfied a positional relation that the detection axis 61a is orthogonal to the rotational axis 32a of the pump 32 and the rotational axis 33a of the motor 33.

The acceleration sensor 62 is provided with a mass which is supported by a beam, for example. The acceleration sensor 62 measures a strain of the beam which is bent when acceleration acts on the vehicle M, and outputs the strain as a detection signal to the control board 50.

Figure 6:
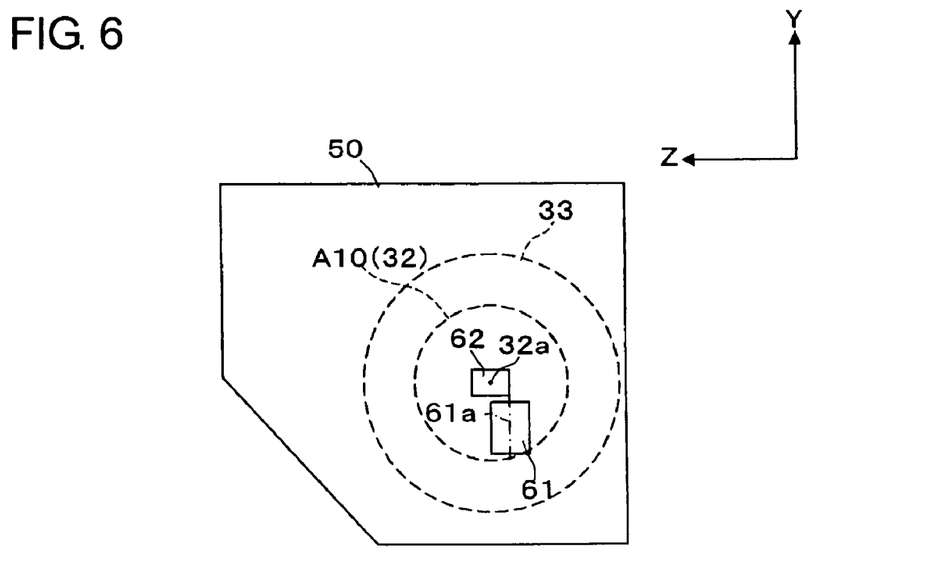
FIG. 6 is an explanatory view showing the positional relations of a yaw rate sensor and an acceleration sensor, arranged on a control board, relative to a pump.

Further, it is desirable that the yaw rate sensor 61 and the acceleration sensor 62 are disposed on the control board 50 and at a position which is adjacent to respective support points given by elastic support members 81-83 referred to later. Further, it is desirable that the yaw rate sensor 61 and the acceleration sensor 62 are disposed or mounted on the control board 50 and in an area A10 corresponding to the pump 32, as shown in FIG. 6, or at a position adjacent to the area A10. To be more exact, the area A10 is defined as that area to which the contour or profile of the cross-section of the largest-diameter rotational part of the pump 32, that is, the cross-section contour or profile of the internal gear 32c2 is projected on the control board 50. The area A10 covers an area which is radially in a predetermined distance around the rotational axis 32a of the pump 32. FIG. 6 shows the control board 50 as viewed from the left side of the vehicle.

Further, a reservoir tank 14 shown in FIG. 1 stores brake fluid and supplies the fluid to the master cylinder 12 and the hydraulic unit 21. The reservoir tank replenishes brake fluid to the master cylinder 12 through a piping 19.

The motion control device 13 as constructed above is supported by the bracket 70, secured to the vehicle body B of the vehicle M, through the three (i.e., first to third) elastic support members 81-83. As shown in FIGS. 2 to 4, the bracket 70 is configured to have a support portion 71 and a fixing portion 72 provided to extend from the support portion 71.

The support portion 71 is formed to bodily connect a first plate 71a, a second plate 71b and a third plate 71c with one another and supports the motion control device 13.

The first plate 71a extends to face the motor mounting surface 23a in parallel relation, as shown mainly in FIGS. 3 and 4. The first elastic support member 81 is securely fitted in the first plate 71a. The first elastic support member 81 is jointed with the motor mounting surface 23a by means of a clamping bolt 91 which passes through the first elastic support member 81. Thus, the motor mounting surface 23a is supported by the first plate 71a through the first elastic support member 81. The support direction by the first elastic support member 81 is the axial direction of the first elastic support member 81, that is, a direction which is normal to the motor mounting surface 23a and parallel to an X-axis direction (refer to FIGS. 2 and 3).

The X-axis, a Y-axis and a Z-axis are three coordinate axes of a three-dimensional coordinate system having Cartesian coordinates. The X-axis direction is the left-right direction as viewed in FIG. 2 and coincides with, for example, the left-right direction of the vehicle M. The Y-axis direction is the vertical direction as viewed in FIG. 2 and coincides with the vertical direction of the vehicle M. The Z-axis direction is the direction normal to the drawing sheet of FIG. 2 and coincides with, for example, the front-rear direction of the vehicle M.

As shown mainly in FIG. 2, the second plate 71b extends to face the surface 23d opposite to the port forming surface 23c in parallel relation. The second elastic support member 82 is securely fitted in the second support plate 71b. The second elastic support member 82 is jointed with the surface 23d by means of a clamping bolt 92 which passes through the second elastic support member 82. Thus, the surface 23d is supported by the second plate 71b through the second elastic support member 82. The support direction by the second elastic support member 82 is the axial direction of the second elastic support member 82, that is, a direction which is normal to the surface 23d and parallel to the Y-axis direction (refer to FIGS. 2 and 4).

As shown mainly in FIGS. 2 to 4, the third plate 71c extends to face the surface 23f opposite to the connector surface 23e in parallel relation. The third elastic support member 83 is securely fitted in the third support plate 71c. The third elastic support member 83 is jointed with the surface 23f by means of a clamping bolt 93 which passes through the third elastic support member 83. Thus, the surface 23f is supported by the third plate 71c through the third elastic support member 83. The support direction by the third elastic support member 83 is the axial direction of the third elastic support member 83, that is, a direction which is normal to the surface 23f and parallel to the Z-axis direction (refer to FIGS. 3 and 4).

Desirably, the support points A1-A3 of the motion control device 13 by the respective elastic support members 81-83 are on the respective surfaces 23a, 23d and 23f supported by the respective elastic support members 81-83, and the respective points A1-A3 are at portions which are spaced apart from a corner point P10 defined by the three surfaces 23a, 23d, 23f, longer distances than the distances between the centers of the respective surfaces 23a, 23d, 23f and the corner point P10. The respective points A1-A3 are spaced from one another beyond respective predetermined distances. The respective predetermined distances are set to respective half values of the distances between the respective support points where the respective support points are set to respective corner points opposite to the corner point P10 on the respective surfaces.

The support point A1 is provided on the surface 23a and at the edge of a side (an intersection line between the surfaces 23a and 23e) which is opposite to the corner point P10, as shown in FIG. 4. The support point A2 is on the surface 23d and at the edge of a side (an intersection line between the surfaces 23d and 23b) which is opposite to the corner point P10, as understood from FIGS. 2 and 4. The support point A3 is on the surface 23f and in the neighborhood, or at the edge, of a side (an intersection line between the surfaces 23c and 23f) which is opposite to the corner point P10.

Figure 5:
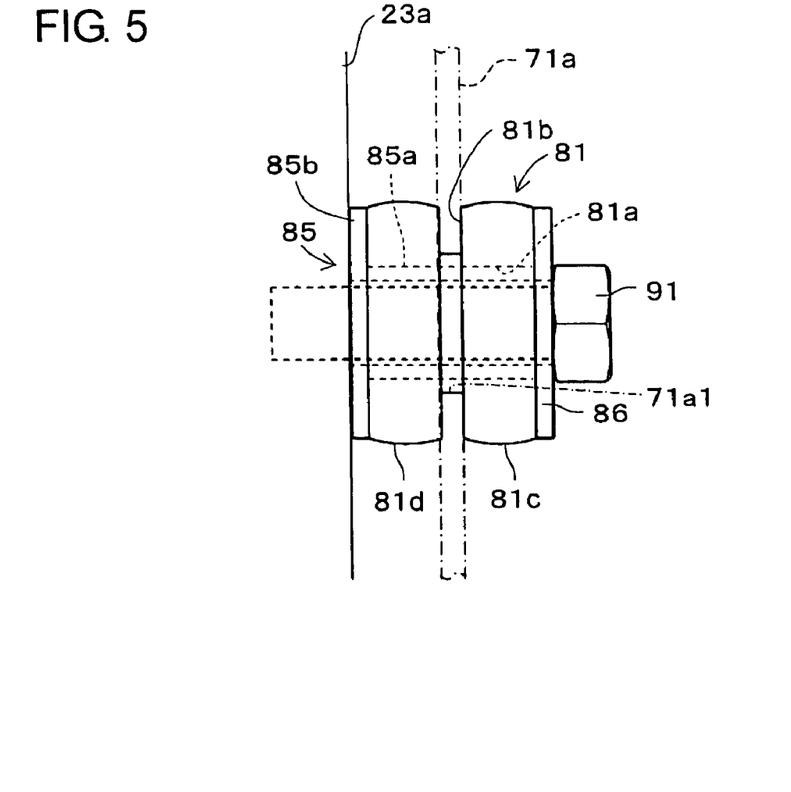
FIG. 5 is a fragmentary view showing the state of supporting the motion control device by means of an elastic support member.

Further, each of the aforementioned elastic support members 81-83 supports the motion control device 13 with itself being compressed in the support direction thereof. This will be described in detail by taking the first elastic support member 81 as an example. As shown in FIG. 5, the first elastic support member 81 is made of an elastic material (e.g., rubber material) and formed into a cylindrical shape. The first elastic support member 81 has a through hole 81a formed at the center to extend in the axial direction and also has an annular groove 81b formed on the external wall surface in the middle of the axial direction. The through hole 81a receives a sleeve portion 85a of a first fitting metal 85, and the clamping bolt 91 passes through the sleeve portion 85a. The annular groove 81b allows the edge portion of a cutout portion 71a1 (or a hole portion) of the first plate 71a to fitted therein, so that a first portion 81c and a second portion 81d partitioned by the annular groove 81*b* hold the edge portion of the cutout portion 71*a*1 (or the hole portion) of the first plate 71*a*.

The first fitting metal 85 is composed of the sleeve portion 85*a* and a flange 85*b* jointed with one end of the sleeve portion 85*a*. In order to bring the flange 85*b* into abutting engagement with the surface 23*a* of the motion control device 13, the sleeve portion 85*a* of the first fitting metal 85 is inserted into the through hole 81*a* of the first elastic support member 81 from the side of the second portion 81*d*. A washer (second fitting metal) 86 is arranged on the side of the other end portion of the first fitting metal 85. The first elastic support member 81 is jointed with the motor mounting surface 23*a* by screwing the clamping bolt 91 into a threaded hole opening on the motor mounting surface 23*a*, with the itself being put between the first fitting metal 85 and the washer 86. The clamping bolt 91 is screwed into the motor mounting surface 23*a* at right angles to the same, so that the axial direction of the first elastic support member 81 becomes normal to the motor mounting surface 23*a*.

The entire length of the sleeve portion 85*a* is set to be shorter than the axial length of the first elastic support member 81. When the clamping bolt 91 is put into screw engagement, the first elastic support member 81 is compressed axially to bring the washer 86 into abutting engagement with the first fitting metal 85, so that the rigidity of the first elastic support member 81 in the axial direction can be set to a prescribed value.

The fixing portion 72 secures the support portion 71 to the vehicle body B. As mainly shown in FIG. 3, the fixing portion 72 is composed of first to fourth fixing portions 72*a*-72*d*. The first fixing portion 72*a* is provided on the gravity center G side of the motion control device 13 with respect to one plane which includes all of the support points A1-A3 by the elastic support members 81-83, and is jointed with a front right portion of the support portion 71. The second fixing portion 72*b* is provided on a side opposite to the gravity center G of the motion control device 13 with respect to the one plane and is jointed with a back left portion of the support member 71. The third fixing portion 72*c* is jointed with a front left portion of the support portion 71. The fourth fixing portion 72*d* is jointed with a back right portion of the support portion 71. The first to fourth fixing portions 72*a*-72*d* are secured at their base portions to the vehicle body B by means of, e.g., respective clamping bolts (not shown).

It is desirable that the fixing portion 72 should be composed of three or more fixing portions including at least the first fixing portion 72*a* and the second fixing portion 72*b*.

Further, the elastic support members 81-83 are configured to make a resonance point of the motion control device 13 higher than a detection frequency band of the yaw rate sensor 61. The detection frequency band of the yaw rate sensor 61 is a band width to detect the yaw rate (yawing) of the vehicle M and is less than 10-20 Hz for example. In order to make the resonance point of the motion control device 13 higher than the detection frequency band of the yaw rate sensor 61, the rigidity of the elastic support members 81-83 is increased in the following manner. For example, each elastic support member 81-83 may be increased in hardness, may be made to be short in the thickness in the axial direction, or may be increased in interference.

Further, it is desired that the bracket 70 is structured to make the resonance point of the motion control device 13 higher than the detection frequency band of the yaw rate sensor 61. This can be done, for example, by increasing the hardness of the bracket 70 or by increasing the thickness of the bracket 70. This can also be done, for example, by increasing the rigidity of each elastic support member 81-83 only, by increasing the rigidity of the bracket 70 only or by increasing the rigidities of the both members.

Further, in a modified form, the motion control device 13 may be secured directly to the bracket 70 which is secured directly to the vehicle body B, without using the elastic support members 81-83.

Further, as shown in FIG. 4, the motion control device 13 is supported by the bracket 70 so that the rotational axis 32*a* of the pump 32 or an extension line of the rotational axis 32*a* passes through an area S1 which is defined by connecting the support points A1-A3 for the motion control device 13.

As is clear from the foregoing description, in the first embodiment, the yaw rate sensor 61, the motor 33 and the rotary pump 32 are arranged to satisfy a positional relation that the extending direction of the detection axis 61*a* of the yaw rate sensor 61 does not coincide with (hence, differs from) both of the extending directions of the rotational axes 33*a*, 32*a* of the motor 33 and the rotary pump 32. Thus, even when the driving of the pump drive section 32*b* by the operation of the motor 33 causes a rotational moment around the respective rotational axes 33*a*, 32*a* to be applied to the motor 33 and the pump 32, the yaw rate sensor 61 can be suppressed from detecting the rotational behavior or movement of the main body 23 caused by the rotational moment. Therefore, it can be realized to enhance the accuracy of the motion control device 13 in detecting the behavior of the vehicle.

Further, the pump 32 is a rotary pump, and the pumping sections 32*c* are rotated with rotation of the pump drive section 32*b* to perform the pump function. Thus, it is easy to smoothen the pulsation of the pumping sections 32*c*, and hence, it can be realized to further suppress the vibration of the pump per se by the use of the rotary pump 32.

Further, the pump 32 has the plurality of pumping sections 32*c*, which are arranged in series along the rotational axis 32*a* of the pump drive section 32*b*, and two adjacent pumping sections 32*b* have respective suction ports 32*c*3 arranged on radially opposite sides with respect to the rotational axis of the pumping sections 32*c* (which coincides with the rotational axes 32*a*, 33*a* in this particular embodiment) and respective discharge ports 32*c*4 arranged on radially opposite sides with respect to the rotational axis of the pumping sections 32*c*. Thus, since the pumping sections 32*c* are arranged with good balance for rotation to reduce the fluctuation in rotational load of the pump drive section 32*b*, it can be realized to suppress the vibration during the pump operation to a low level.

Further, the motion control device 13 is supported on the vehicle body B of the vehicle M through the elastic support members 81-83 and the bracket 70, and both of the elastic support members 81-83 and the bracket 70 are structured or configured to make the resonance point of the motion control device 13 higher than the detection frequency band of the yaw rate sensor 61. Thus, when the vibration generated by the operation of the rotary pump 32 causes the motion control device 13 to resonate, the influence on the yaw rate sensor 61 of the vibration generated by the operation of the rotary pump 32 can be excluded to the utmost because the resonance frequency is higher than the detection frequency band of the yaw rate sensor 61. Therefore, the accuracy in detecting the behavior of the vehicle can be further enhanced.

The motion control device 13 may be secured directly to the bracket 70 which is secured directly to the vehicle body B of the vehicle M, without using the elastic support members 81-83. In this modified form, since the resonance frequency of the motion control device 13 is much higher than the detection frequency band of the yaw rate sensor 61, the influence on the yaw rate sensor 61 of the vibration generated by the operation of the rotary pump 32 can be excluded to the utmost even when vibration is generated by the rotation of the rotary pump 32. Therefore, the detection accuracy in detecting the behavior of the vehicle can be further enhanced.

Further, the motion control device 13 is supported by the bracket 70 so that the rotational axis 32a of the rotary pump 32 or an extension line of the rotational axis 32a passes through the area S1 which is defined by connecting the support points A1-A3 for the motion control device 13. Thus, when the operation of the rotary pump 32 causes the motion control device 13 to suffer revolution fluctuation around the rotational axis 32a, the bracket 70 can absorb the revolution fluctuation in a well-balanced manner, so that it can be realized to reduce the influence of the revolution fluctuation attributed from the rotary pump 32.

Further, the control unit 22 contains the control board 50, and the yaw rate sensor 61 is arranged on the control board 50 and in the area A10 which corresponds to (i.e., is defined by the projection on the control board 50 of) the cross-section contour or profile of the largest-diameter rotational part of the rotary pump 32, that is, the cross-section contour or profile of the internal gear 32c2. Thus, even when the operation of the rotary pump 32 causes the motion control device 13 to revolve around the rotational axis 32a, the displacement of the yaw rate sensor 61 can be diminished, and therefore, it can be realized to reduce the influence of the revolution fluctuation caused by the rotary pump 32 in detecting the yaw rate.

Also in the case of providing the acceleration sensor 62 for detecting the acceleration of the vehicle M, the acceleration sensor 62 is arranged on the control board 50 and in the area A10 which corresponds to (i.e., is defined by the projection on the control board 50 of) the cross-section contour or profile of the largest-diameter rotational part of the rotary pump 32, that is, the cross-section contour or profile of the internal gear 32c2. Thus, even when the rotation of the rotary pump 32 causes the motion control device 13 to revolve around the rotational axis 32a, the displacement of the acceleration sensor 62 can be diminished, and therefore, it can be realized to reduce the influence of the revolution fluctuation caused by the rotary pump 32 in detecting the acceleration.

Further, the pulsation frequency of the rotary pump 32 is set to be higher than the detection frequency band of the yaw rate sensor 61. Thus, even when the motion control device 13 is vibrated due to the pulsation caused by the operation of the rotary pump 32, the influence of the vibration generated by the operation of the rotary pump 32 can be excluded to the utmost because the pulsation frequency is higher than the detection frequency band of the yaw rate sensor 61. Therefore, the accuracy in detecting the vehicle behavior can be further enhanced.

Second Embodiment

Figure 8:
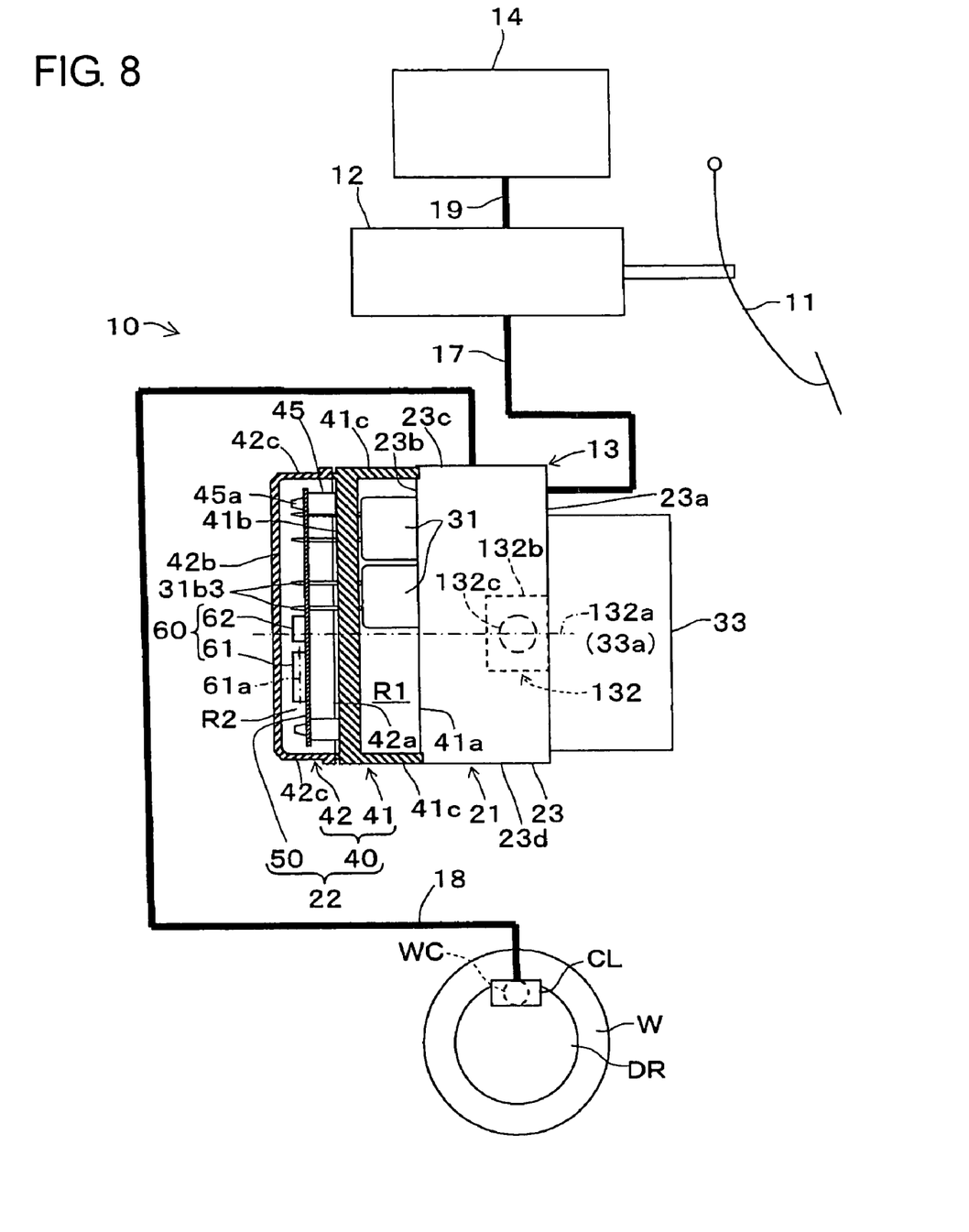
FIG. 8 is a schematic view showing a second embodiment of a motion control device with a piston pump for a vehicle according to the present invention.
Figure 9:
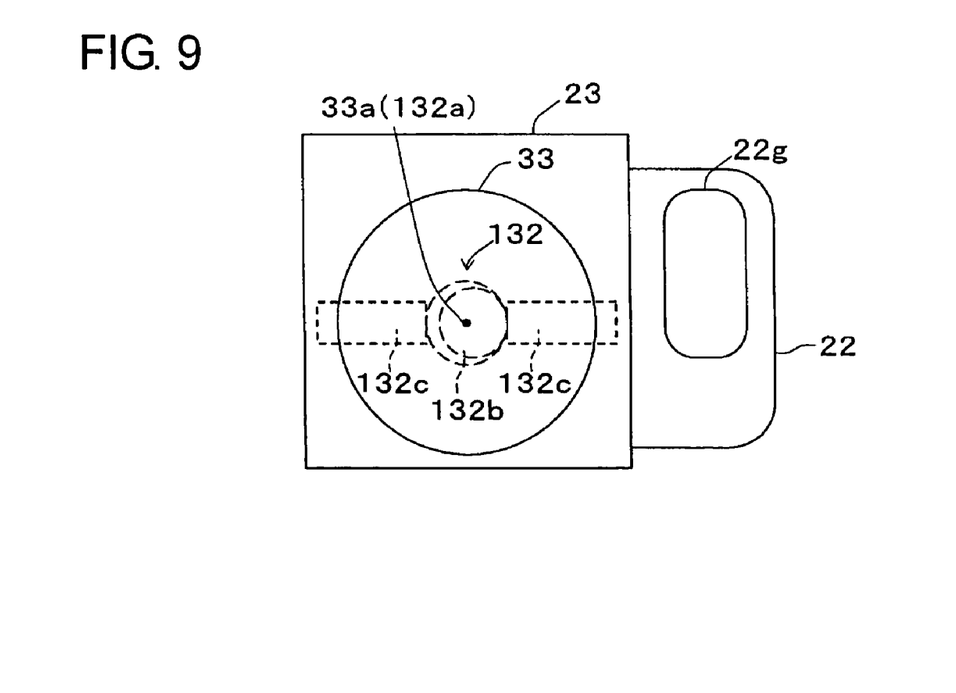
FIG. 9 is a right side view of the motion control device shown in FIG. 8.

Instead of being applied to a motion control device with a rotary pump for a vehicle, the present invention may be applied to a motion control device with a piston pump. This modification or second embodiment will then be described with reference to FIGS. 8 to 10. FIG. 8 is a schematic front view, partly in section, of a hydraulic brake system 10 to which a motion control device 13 provided with a piston pump 132 for a vehicle M is applied. FIG. 9 is a right side view of the hydraulic brake system 10, and FIG. 10 is a fragmentary sectional view showing the piston pump 132.

Specifically, the pump 132 being as piston pump is composed of a pump drive section 132b drivingly rotated by the motor 33 and a plurality (e.g., two in this particular embodiment) of pumping sections 132c which perform a pump function with rotation of the pump drive section 132b.

Figure 10:
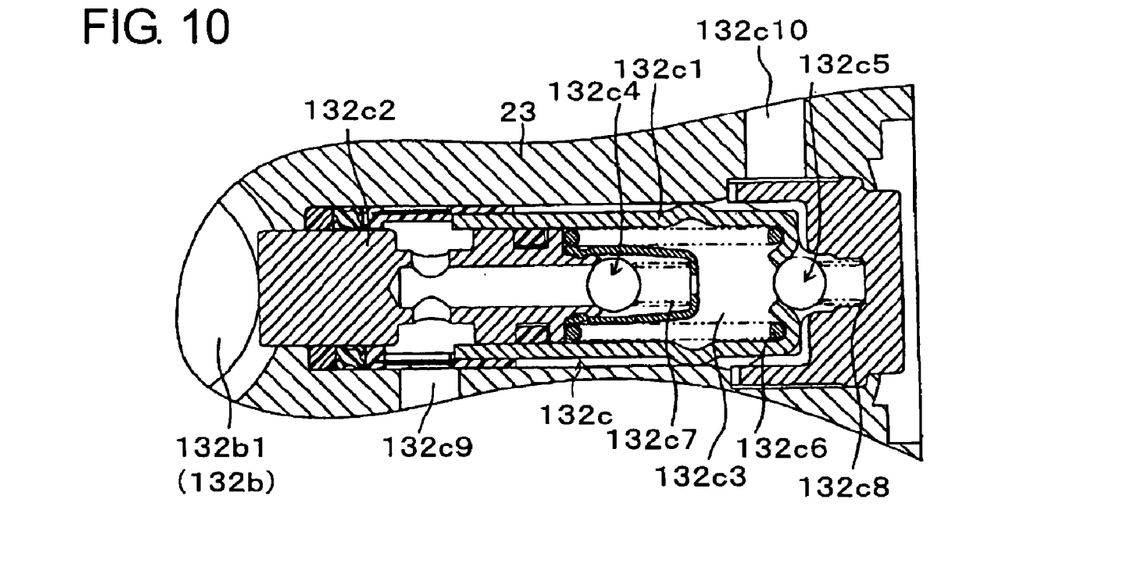
FIG. 10 is a fragmentary sectional view showing a partial construction of the piston pump shown in FIG. 8.

As shown mainly in FIGS. 9 and 10, the pump drive section 132b is provided with an eccentric cam 132b1 which is coupled to the output shaft 33b of the motor 33 to be coaxial and rotatable bodily. Each of the pumping sections 132c is composed of a cylinder 132c1, a piston 132c2 movable to reciprocate axially and fluid-tightly in the cylinder 132c1, a suction valve 132c4 for drawing brake fluid into a pump chamber 132c3, and a discharge valve 132c5 for discharging brake fluid from the pump chamber 132c3.

The cylinder 132c1 is securely press-fitted into the main body 23, and the pump chamber 132c3 is formed in the cylinder 132c1 between the cylinder 132c1 and the piston 321c2. The piston 132c2 is in contact at its one end surface with an external surface of the eccentric cam 132b1 which is rotationally driven by the motor 33, and allows the external surface of the eccentric cam 132b1 to slide on the one end surface. With rotation of the eccentric cam 132b1, the piston 132c2 decreases the volume of the pump chamber 132c3 when axially moved against the resilient force of a return spring 132c6 and increases the volume of the pump chamber 132c3 when axially returned by means of the resilient force of the return spring 132c6.

The suction valve 132c4 is provided at a pump chamber side end portion of the piston 132c2 and is urged by means of a spring 132c7 to be opened when the pump chamber 132c3 increases its volume and to be closed when the pump chamber 132c3 decreases its volume. The discharge valve 132c5 is provided at a discharge side end portion of the cylinder 132c1, that is, on the discharge side of the pump chamber 132c3, and is urged by means of a spring 132c8 to be closed when the pump chamber 132c3 increases its volume and to be opened when the pump chamber 132c3 decreases its volume.

In the piston pump 132 as constructed above, when the eccentric cam 132b1 is drivingly rotated by the motor 33, the piston 132c2 is axially reciprocated by the cooperation of the eccentric cam 132b1 with the return spring 132c6 to repetitively increase and decrease the volume of the pump chamber 132c3, and the suction valve 132c4 and the discharge valve 132c5 respectively function to feed fluid from a suction port 132c9 toward a discharge port 132c10. That is, with rotation of the pump drive section 132b, each of the pumping sections 132c is moved reciprocatingly to perform a pump function.

The respective pumping sections 132c are arranged around the rotational axis 132a of the pump drive section 132b at equiangular distance on the same plane intersecting the rotational axis 132a. In the piston pump 132, the rotational axis 33a of the motor 33 is a center axis of the output shaft 33b and is in alignment with the rotational axis 132a of the pump drive section 132b.

In the motion control device 13 for a vehicle provided with the piston pump 132 as described above, the yaw rate sensor 61, the motor 33 and the pump 132 are arranged to satisfy a positional relation that the extending direction of the detection axis 61a of the yaw rate sensor 61 differs from both of the extending directions of the rotational axis 33a of the motor 33 and the rotational axis 132a of the pump drive section 132b. Thus, when the driving of the pump drive section 132b by the operation of the motor 33 causes a rotational moment around the rotational axis 33a, 132a to be applied to the motor 33 and the pump drive section 132b, the yaw rate sensor 61 can be suppressed from detecting the rotational behavior or movement of the main body 23 caused by the rotational moment. Therefore, it can be realized to enhance the accuracy of the motion control device in detecting the behavior of the vehicle.

Further, the pump 132 is a piston pump and performs a pump function through the reciprocating movements of the pumping sections 132c during rotation of the pump drive section 132b. Thus, even in the case of the piston pump 132 being used, the yaw rate sensor 61 can be suppressed from detecting the rotational behavior or movement of the main body 23 caused by a rotational moment which may be generated around the rotational axis 132a of the motor 33 and the pump drive section 132b when the pump drive section 132b is driven by the operation of the motor 33.

Further, the pump 132 has the plurality of pumping sections 132c, which are arranged around the rotational axis 132a of the pump drive section 132b at equiangular distances (e.g., 180-degree interval in the case of two pumping sections 132c) on the same plane intersecting the rotational axis 132a of the pump drive section 132b. Thus, even in the case of providing the plurality of pumping sections 132c, since the load on the pump drive section 132b is applied with good balance to reduce the fluctuation in rotation, it can be realized to suppress the vibration of the piston pump 132 to a level as low as possible.

Further, when the occurrence of vibration with the operation of the pump 132 causes the motion control device 13 to resonate, the frequency of such resonance is higher than the detection frequency band of the yaw rate sensor 61. Thus, the influence of the vibration by the operation of the pump 132 can be excluded to the utmost, and hence, the accuracy in detecting the vehicle behavior can be further enhanced.

Further, the motion control device 13 is secured directly to the bracket 70 which is secured directly to the vehicle body B of the vehicle M, without using the elastic support members 81-83. Thus, since the frequency at which the motion control device 13 resonates with the vibration which may occur with the operation of the pump 132 is much higher than the detection frequency band of the yaw rate sensor 61, the influence of the vibration by the operation of the pump 132 can be excluded to the upmost, and hence, the accuracy in detecting the vehicle behavior can be further enhanced.

Furthermore, the motion control device 13 is supported by the bracket 70 with the rotational axis 132a of the pump drive section 132b or the extension line of the rotational axis 132a passing through the area S1 (refer to FIG. 4) which is defined by connecting the support points A1-A3 for the motion control device 13. Thus, when the operation of the pump 132 causes the motion control device 13 to rotationally fluctuates around the rotational axis 132a, the rotational fluctuation can be absorbed by the bracket 70 in a well-balanced manner, and hence, it can be realized to reduce the influence which is exerted on the motion control device 13 by the rotational fluctuation of the pump drive section 132b.

Furthermore, the control unit 22 contains the control board 50, and the yaw rate sensor 61 is arranged on the control board 50 and in the area A10 (refer to FIG. 6) which corresponds to (or is defined by the projection on the control board 50 of) the cross-section contour or profile of the largest-diameter rotational part of the pump 132, that is, the cross-section contour or profile of the eccentric cam 132b1 in the second embodiment. Thus, when the operation of the pump 132 causes the motion control device 13 to revolve around the rotational axis 132a, the displacement of the yaw rate sensor 61 can be diminished, and hence, it can be realized to detect the yaw rate with reduction being achieved of the influence by the pump drive section 132b of the pump 132 fluctuating rotationally.

Still furthermore, the acceleration sensor 62 is arranged on the control board 50 and in the area A10 which corresponds to (or is defined by the projection on the control board 50 of) the cross-section contour or profile of the largest-diameter rotational part of the pump 132, that is, the cross-section contour or profile of the eccentric cam 132b1 in the second embodiment. Thus, when the operation of the pump 132 causes the motion control device 13 to revolve around the rotational axis 132a, the displacement of the acceleration sensor 62 can be decreased, and hence, it can be realized to detect the acceleration with reduction being achieved of the influence by the pump drive section 132b of the pump 132 fluctuating rotationally.

Additionally, the pulsation frequency of the pump 132 is set to be higher than the detection frequency band of the yaw rate sensor 61. Thus, when the pulsation generated by the operation of the pump 132 causes the motion control device 13 to vibrate, the influence of the vibration caused by the operation of the pump 132 is excluded to the utmost because the pulsation frequency is higher than the detection frequency band of the yaw rate sensor 61, and hence, the accuracy in detecting the vehicle behavior can be further enhanced.

Although in the foregoing respective embodiments, the motion control device 13 is supported by the three elastic support members, there may be used four or more elastic support members in supporting the motion control device 13. In this modified form, it is desirable that respective support directions by at least three of the elastic support members are three directions which are parallel respectively to three coordinate axes of a three-dimensional coordinate system.

Although in the foregoing respective embodiments, the piping arrangement of the brake system is an X-piping fashion in a front-engine front-drive vehicle, it may be a front-rear piping fashion in a front-engine rear-drive vehicle. Each of the foregoing respective embodiments may use a vacuum booster as a booster device or may use another booster device of the type that the hydraulic pressure generated by a pump is accumulated in an accumulator to utilize the hydraulic pressure accumulated in the accumulator for boost operation. Further, the present invention may be applied to a hydraulic brake device of a so-called "brake-by-wire" type.

Obviously, numerous further modifications and variations of the present invention are possible in light of the above teachings. It is therefore to be understood that within the scope of the appended claims, the present invention may be practiced otherwise than as specifically described herein.

What is claimed is:

1. A motion control device for a vehicle, comprising:
a hydraulic unit mounting therein a pump for generating a controlled hydraulic pressure applied to respective wheel cylinders of the vehicle;
a control unit provided with a yaw rate sensor for detecting a yaw rate of the vehicle and capable of controlling the hydraulic unit, wherein the hydraulic unit and the control unit are integrated;
a bracket secured to a vehicle body of the vehicle; and
three support members having respective support directions which extend respectively in three orthogonal directions, and secured respectively to three mutually adjoining surfaces of the hydraulic unit for supporting the hydraulic unit on the bracket; and wherein:
the pump is composed of a pump drive section drivingly rotated by a motor and a pumping section for performing a pump function with rotation of the pump drive section;
the motion control device is supported by the bracket through the three support members with the rotational axis of the pump drive section or an extension line of the rotational axis passing through an area which is defined by connecting support points at which the three support members support the motion control device; and the three support members secured to the three mutually adjoining surfaces of the hydraulic unit are arranged at portions each of which is spaced from one corner point, defined jointly by the three mutually adjoining surfaces of the hydraulic unit, a longer distance than a distance between the corner point and a center of an associated one of the three mutually adjoining surfaces.

2. A motion control device for a vehicle, comprising:

a hydraulic unit mounting therein a pump for generating a controlled hydraulic pressure applied to respective wheel cylinders of the vehicle;

a control unit provided with a yaw rate sensor for detecting a yaw rate of the vehicle and capable of controlling the hydraulic unit, wherein the hydraulic unit and the control unit are integrated;

a bracket secured to a vehicle body of the vehicle; and three support members having respective support directions which extend respectively in three orthogonal directions, and secured respectively to three mutually adjoining surfaces of the hydraulic unit for supporting the hydraulic unit on the bracket; and wherein:

the pump is composed of a pump drive section drivingly rotated by a motor and a pumping section for performing a pump function with rotation of the pump drive section;

the motion control device is supported by the bracket through the three support members with the rotational axis of the pump drive section or an extension line of the rotational axis passing through an area which is defined by connecting support points at which the three support members support the motion control device; and the three support members are plate portions bodily formed and mutually orthogonal to extend in parallel respectively to the three mutually adjoining surfaces of the hydraulic unit.

3. A motion control device for a vehicle, comprising:

a hydraulic unit mounting therein a pump for generating a controlled hydraulic pressure applied to respective wheel cylinders of the vehicle;

a control unit provided with a yaw rate sensor for detecting a yaw rate of the vehicle and capable of controlling the hydraulic unit, wherein the hydraulic unit and the control unit are integrated;

a bracket secured to a vehicle body of the vehicle; and three support members having respective support directions which extend respectively in three orthogonal directions, and secured respectively to three mutually adjoining surfaces of the hydraulic unit for supporting the hydraulic unit on the bracket; and wherein:

the pump is composed of a pump drive section drivingly rotated by a motor and a pumping section for performing a pump function with rotation of the pump drive section;

the motion control device is supported by the bracket through the three support members with the rotational axis of the pump drive section or an extension line of the rotational axis passing through an area which is defined by connecting support points at which the three support members support the motion control device; and the support directions of two of the three support members are parallel respectively to the front-rear direction and the vertical direction of the vehicle.

* * * * *